Ralph Neuhaus
INVENTOR
BY Jesse R. Stone
ATTORNEY

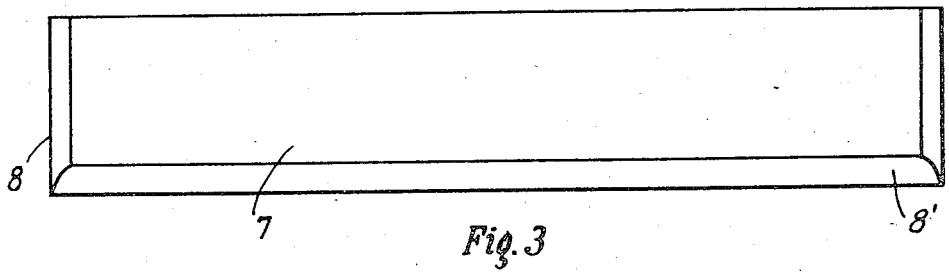
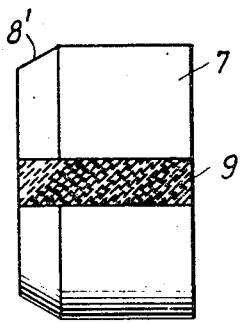
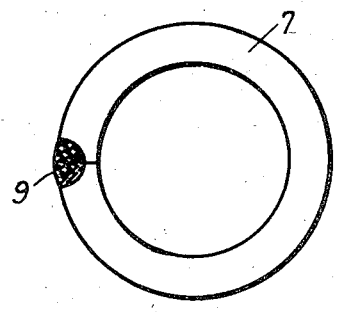

Patented Aug. 25, 1942

2,293,997

UNITED STATES PATENT OFFICE 2,293,997

METHOD OF MAKING TOOL JOINTS

Ralph Neuhaus, Houston, Tex., assignor to Hughes Tool Company, Houston, Tex., a corporation of Delaware Application August 1, 1939, Serial No. 287,695

4 Claims. (Cl. 29—148.2)

The invention relates to methods of making tool joints such as are employed in connecting together sections of drill stem used in well drilling. It is concerned particularly with tool joints which are attached integrally upon the ends of drill pipe sections.

Tool joints are most commonly made of larger external diameter than is the body of the pipe section to which they are attached. In use the tool joints contact with the side of the well bore and as the drill stem is rotated, the exterior of the joints and the adjacent upset end of the pipe are worn until they are no longer safe. The shoulder beneath which the elevators engage becomes so reduced that it no longer provides a sufficient stop against which the elevators may contact to support and lift the drilling string. If the tool joint is cut off and a new one substituted, the wall of the pipe is still so worn that a strong and substantial connection of the new joint with the pipe is impossible.

Furthermore, the formation of tool joints integrally with the pipe is difficult and expensive due to the fact that the tool joint itself must be of harder steel than is the pipe and also to problems of manufacture. It is therefore desired to provide a method of attaching tool joints to the pipe end which will be simple and economical of accomplishment.

It is also an object of this invention to provide a method of bringing the pipe end of a worn joint up to its original gage and to thus furnish a connection between the pipe and the tool joint which is as satisfactory as the original joint.

It is desired to be able to provide a method for replacing a tool joint upon a pipe end with which it is integrally attached, in such manner that the original strength and size of the joint is not impaired.

It is a further object to form the outer face of the pipe at the joint so as to resist wear and abrasion thereon.

In the drawings herewith,

Fig. 3 is a plan view of a blank from which the pipe end may be repaired.

Figs. 4 and 5 are side elevation, and end views respectively of the sleeve employed in bringing the pipe end up to its original gage of the joint.

Figure 2:
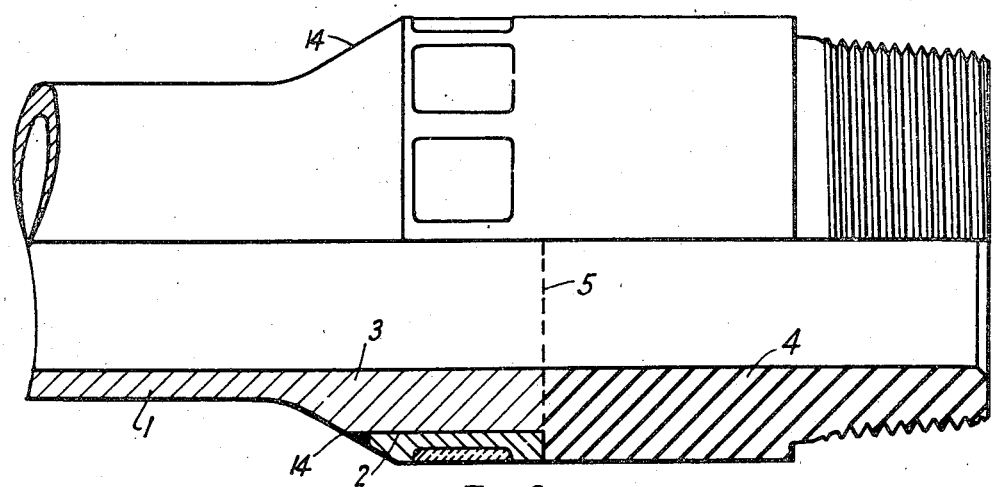
Fig. 2 is a view similar to Fig. 1 in its finished form.

Where a pipe end and the tool joint formed integrally thereon, and also where the tool joint was originally screwed to the pipe, has become so worn that it has to be either discarded or repaired. This invention may be employed to advantage. It is also obvious that the new tool joint can be originally attached to the upset end of a pipe section by this means. In the drawings the pipe 1, in use becomes worn, particularly along the outer surface 2 of the upset end 3. Also the tool joint 4 becomes worn and needs replacement. In such case the old joint is cut off from the pipe along the line indicated by the dotted line 5. If the pipe is new this will be the form of the end thereof.

The pipe end 3 is then turned down on its outer surface to provide a true cylindrical outer periphery having a diameter of predetermined size materially smaller than is the outer diameter of the new joint 4 to be secured thereto.

Upon this outer periphery is fitted a ring or sleeve 6 which is slightly thicker than is necessary to bring the outer diameter of the pipe up to that of the joint 4. This sleeve may be forged, or may be cut from tubular stock if desired, but preferably it is formed as illustrated in Figs. 3 to 5 inclusive.

A blank piece of metal plate 7 is cut to the correct dimensions and beveled on three of its edges as shown at 8, 8'. The bevel at the ends is slightly concaved. The blank is then bent into cylindrical form to bring the ends 8 together as shown in Figs. 4 and 5. A bond of welding metal 9 is then employed to secure the ends rigidly together. This may be done on the pipe end if preferred.

Figure 1:
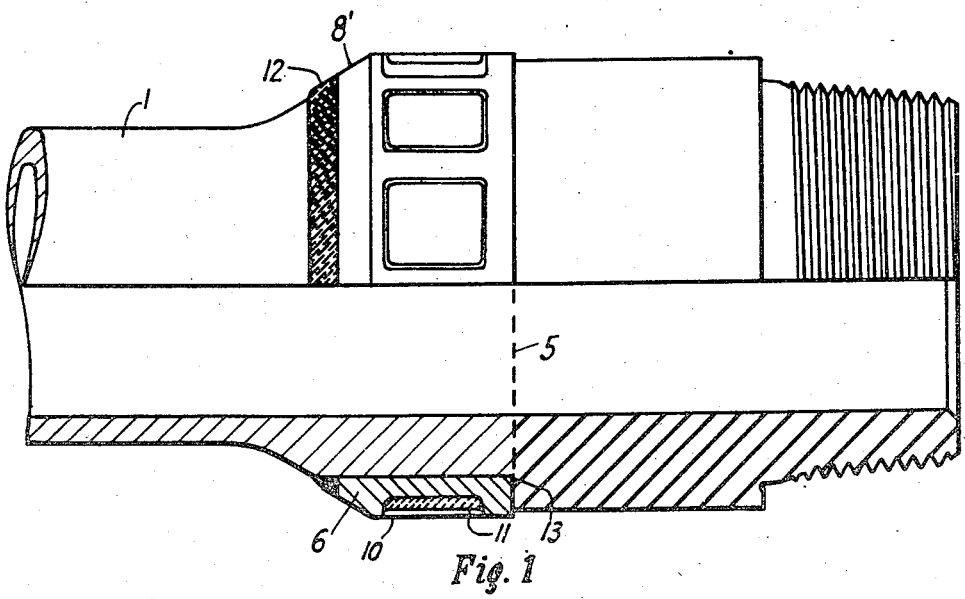
Fig. 1 is a side view partly in central longitudinal section showing a pipe end and tool joint according to this invention before the finishing steps have been taken.

The ring may, if desired, be formed with pockets in its outer face. Said pockets 10 may be approximately rectangular as shown in Figs. 1 and 2, the depth of the recesses or pockets being sufficient to receive therein deposits of hard metal 11 which may be tungsten carbide or similar material. Said deposits do not fill the pockets, but leave enough metal outside the hard material to permit turning down the outer surface of the sleeve. Obviously these deposits of hard material must be placed in position after the plate has been bent to ring form. This may be done by welding the metal in place from a composite rod or tube or any similar method. Also preformed inserts or pads of hard material may be placed in the pockets and brazed in position. If it is preferred a continuous ring of hard facing may be employed instead of spaced areas as shown so long as the hard material is presented in such way as to prevent excessive wear.

The sleeve is then fixed upon the outer surface of the pipe end with the beveled portion 8' away from the pipe end. Welding metal 12 is used to secure the sleeve rigidly in position.

The end 13 of the pipe and sleeve are then butt welded to the end of the tool joint, the hard metal of the joint being distinguished from the metal of the pipe and sleeve by heavier cross hatching in Figs. 1 and 2. In welding these two parts together they must be in exact axial alignment which means that sometimes the outer peripheries of the joint and sleeve do not come exactly flush. However, as the sleeve 6 is thicker than is necessary, it may be turned down from its oversize form as shown in Fig. 1, to its final size shown in Fig. 2 with the periphery flush with that of the joint 4. Also the beveled end of the sleeve and the bond of welding metal 12 in Fig. 1 are turned down to an accurate shoulder 14 as seen in Fig. 2. When the outer surface of the sleeve and the weld have been machined from the form shown in Fig. 1 to the form shown in Fig. 2 the assembled structure is stronger and more wear resisting than is an original joint not hard faced and the life of the pipe is thereby approximately doubled with a minimum of cost of time and material.

The hard material 11 in the welded sleeve serve to protect the whole joint from wear. If the steel of the joint wears somewhat, then the hard metal will contact with the casing or the wall of the well and resist further wear. Ordinarily the placing of areas of hard facing upon a joint might, because of the brittle nature of the hard material, tend to assist the starting of cracks in the wall of the joint. Cracks starting in the hard material would tend to be extended farther into the steel of the joint. However when said hard facing is placed upon the sleeve, any cracks which may be initiated in the hard facing will not be propagated from the sleeve into the pipe or joint and hence will not weaken the pipe or joint.

The resulting structure is therefore strong and durable when the method is employed either in the original construction of a joint or when used in the repair of joints that have become worn.

What is claimed is:

1. A method of constructing tool joints secured upon the ends of externally upset pipe sections, including cutting the pipe at a point spaced from the point of upset, reducing the outer periphery of the pipe to a cylindrical surface, securing upon said periphery a sleeve of steel having an outer diameter slightly oversize relative to the tool joint, forming a bond of welding material about the end of the sleeve adjacent the pipe upset, butt welding the ends of the pipe and sleeve to a new tool joint, and machining the outer surface of said sleeve and said weld to bring the periphery of said sleeve flush with the periphery of said joint.

2. A method of constructing tool joints secured upon the ends of externally upset pipe sections, including cutting the pipe at a point spaced from the point of upset, reducing the outer periphery of the pipe to a cylindrical surface, securing upon said periphery a sleeve of steel having an outer diameter slightly oversize relative to the tool joint and one end of which is beveled externally, forming a bond of welding material above the end of the sleeve and the pipe adjacent the pipe upset, welding the ends of the pipe and sleeve to a new tool joint, and machining the outer surface of said sleeve and said weld to bring the periphery of said sleeve flush with the periphery of said joint, and cutting the beveled end of the sleeve and said weld to form an accurate tapered shoulder on the pipe to receive the pipe elevators.

3. A method of constructing tool joints secured upon the ends of upset pipe sections, including cutting the pipe section at the end to receive the joint, machining the pipe end to a cylindrical form, forming a sleeve upon the periphery by bending a plate to cylindrical form and welding the ends of said plate together upon said pipe end, forming a bond of welding material between said pipe and the end of said sleeve remote from the end of the pipe, welding the pipe and sleeve to a new joint, forming an accurate elevator receiving shoulder on said sleeve and said bond of welding material and cutting the outer periphery of said sleeve to correspond to that of the joint.

4. A method of constructing tool joints secured upon the ends of upset pipe sections, including cutting the pipe section at the end to receive this joint, machining the pipe end to a cylindrical form, forming a sleeve upon the periphery by cutting a rectangular plate of the determined size, bending said plate into the form of a sleeve, placing said sleeve upon said pipe end, welding the ends of said plate together, forming a bond of welding material at the end of said sleeve remote from the end of the pipe, welding the pipe and sleeve to a new joint, forming an accurate elevator receiving shoulder on said sleeve and said bond of welding material and cutting the outer periphery of said sleeve to correspond to that of the joint.

RALPH NEUHAUS.